United States Patent [19]

Cimino et al.

[11] 4,411,918
[45] Oct. 25, 1983

[54] APPARATUS FOR PRESERVING FOOD BY GENERATING PRESERVATIVE GAS

[75] Inventors: Andrea Cimino, Bologna; Gianni Plicchi, S. Lazzaro di Savena; Luigi Mangiarotti, Bologna; Maurizio Rossi, Badia Polesine; Vittorio Betti, Faenza; Massimo Spighi; Gabriele Zingaretti, both of Bologna, all of Italy

[73] Assignee: Kontek - Tecnologie della Conservazione - S.R.L., Bologna, Italy

[21] Appl. No.: 247,118

[22] Filed: Mar. 24, 1981

[30] Foreign Application Priority Data

Mar. 26, 1980 [IT] Italy ................ 12495 A/80

[51] Int. Cl.³ .................................... B65D 81/20
[52] U.S. Cl. .................................... 426/124; 99/467; 206/205; 206/219; 53/432; 422/29; 422/32; 422/40; 422/305; 426/316; 426/319; 426/418; 426/419
[58] Field of Search ............... 426/124, 418, 419, 109, 426/120, 316, 319; 422/29, 40, 32, 236, 305; 206/205, 222, 221, 219; 53/432–434; 99/467

[56] References Cited

U.S. PATENT DOCUMENTS

| | | | |
|---|---|---|---|
| 70,426 | 11/1867 | Elmer et al. | 422/236 |
| 854,617 | 5/1907 | Aaron et al. | 422/236 |
| 1,325,291 | 12/1919 | Hood | 422/236 |
| 1,971,364 | 8/1934 | Zimmer et al. | 426/109 |
| 2,159,835 | 5/1939 | Waters | 426/124 |
| 2,242,686 | 5/1941 | Tirrell | 206/205 |
| 2,288,895 | 7/1942 | Fink | 206/222 |
| 2,719,660 | 10/1955 | Ellis | 426/124 |
| 3,183,057 | 5/1965 | Marks et al. | 422/29 |
| 3,409,444 | 11/1968 | Gentry et al. | 426/319 |
| 3,502,485 | 3/1970 | Illouze | 422/29 |
| 3,559,562 | 2/1971 | Carlson | 426/124 |
| 3,627,393 | 12/1971 | Hickson et al. | 426/120 |
| 3,717,478 | 2/1973 | Lipfert | 426/109 |
| 3,764,351 | 10/1973 | Whittington et al. | 206/497 |
| 4,012,203 | 3/1977 | Rosiere | 422/236 |
| 4,013,422 | 3/1977 | Spinner et al. | 422/236 |
| 4,055,931 | 11/1977 | Myers | 426/419 |
| 4,061,785 | 12/1977 | Nishino | 206/205 |
| 4,233,325 | 11/1980 | Slangan et al. | 426/120 |

FOREIGN PATENT DOCUMENTS

| | | | |
|---|---|---|---|
| 501399 | 7/1919 | France | 426/124 |
| 2313870 | 2/1977 | France | 426/319 |
| 51-23466 | 2/1976 | Japan | 422/305 |

OTHER PUBLICATIONS

Refrigerating Engineering 9/50, Application Data 50.
J. of Agricultural Food Chemistry 1975, vol. 23, #6.

*Primary Examiner*—Steven L. Weinstein
*Attorney, Agent, or Firm*—Berman, Aisenberg & Platt

[57] ABSTRACT

The gas generating device according to the invention comprises a basin-like main container containing a solid chemical reagent substance, and an auxiliary container, arranged at the interior of the main container, containing a liquid chemical reagent substance.

The main container is closed at its top by a cover lid in such a manner as to permit the outflow of gas generated at its interior. The gas generating device is accomodated at the interior of a storage or transport receptacle formed by a stack of superposed crates of fruits or vegetables, enclosed in a gas-tight wrapping of suitable plastic sheet material. When is its desired to generate the preservative gas at the interior of the storage or transport receptacle, the operator, by using a suitable piercing needle, perforates in one single piercing operation the wrapping, the cover lid and the auxiliary container, so that the liquid reagent substance comes into contact with the solid reagent substance, thus giving origin to a chemical reaction which generates the preservative gas. The thus generated preservative gas escapes through the cover lid, and fills the interior of the storage or transport receptacle.

1 Claim, 4 Drawing Figures

U.S. Patent
Oct. 25, 1983
4,411,918
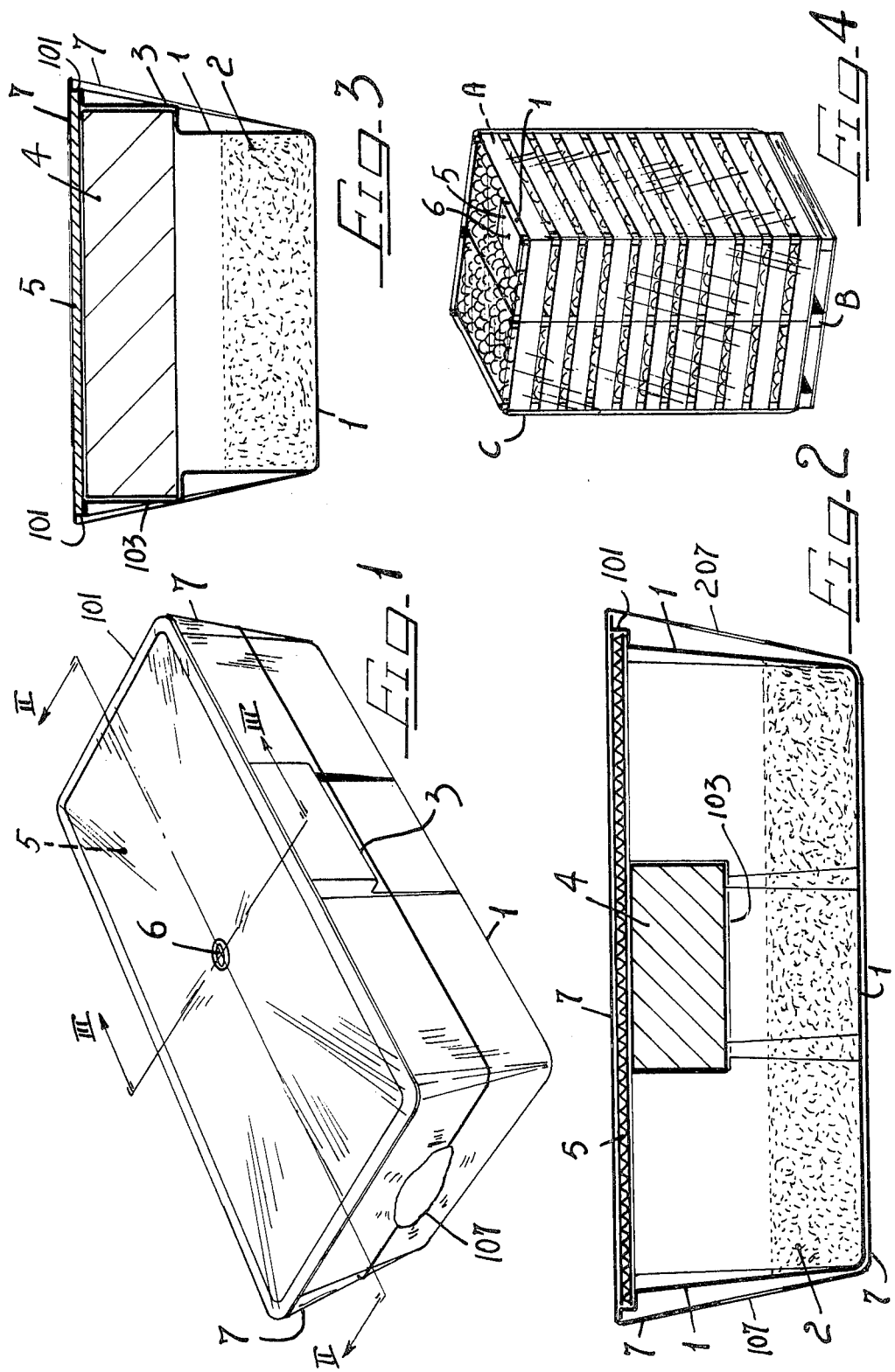

APPARATUS FOR PRESERVING FOOD BY GENERATING PRESERVATIVE GAS

SUMMARY OF THE INVENTION

The present invention relates to a device for the generation of preservative gas to be used for the preservation of food products, particularly fruits and vegetables in gas-tight closed storage spaces such as storage and/or transport receptacles.

The gas generating device according to the present invention is of very simple construction and low costs, and can be disposed of after its use.

The gas generating device according to the invention comprises a basin-like main container containing a solid chemical reagent substance, and an auxiliary container, arranged at the interior of the main container, containing a liquid chemicl reagent substance. The main container is closed at its top by a cover lid in such a manner as to permit the outflow of gas generated at its interior. The gas generating device is accomodated at the interior of a storage or transport receptacle formed by a stack of superposed crates of fruits or vegetables, enclosed in a gas-tight wrapping of suitable plastic sheet material, preferably on top of the stack.

When is its desired to generate the preservative gas at the interior of the storage or transport receptacle, the operator, by using a suitable piercing needle, perforates in one single piercing operation the wrapping, the cover lid and the auxiliary container, so that the liquid reagent substance comes into contact with the solid reagent substance, thus giving origin to a chemical reaction which generates the preservative gas. The thus generated preservative gas escapes through the cover lid, and fills the interior of the storage or transport receptacle.

The above and other features and advantages of the gas generating device according to the invention will appear evident from the following detailed description of a preferred embodiment thereof, given by way of nonlimiting example by making reference to the attached sheet of drawings.

BRIEF DESCRIPTION OF THE DRAWINGS

FIG. 1 is a perspective view from the top of the device for generating preservative gas according to the invention.

FIG. 2 is diagrammatic vertical section of the device according to line II—II of FIG. 1.

FIG. 3 is a diagrammatic vertical section of the device according to line III—III of FIG. 1.

FIG. 4 is a perspective view illustrating a storage and transport receptacle provided with a device according to the invention.

DESCRIPTION OF THE PREFERRED EMBODIMENT

With reference to the drawings, the generator of preservative gas for the preservation of food products in controlled preservative atmosphere comprises a larger, outer main container 1 and a smaller, inner auxiliary container 4. The main container 1 is shaped like a basin or deep rectangular tray, is made of water impervious plastic material and contains a solid, pulverulent or granular, reagent substance 2, which per se is not active, for the generation of a preservative gas. The said solid initial reagent substance can be of course a mixture of chemical reagents. The auxiliary container 4 is also made of water impervious plastic material, is shaped substantially as a rectangular parallelepiped closed on all sides, and contains a liquid reagent substance, which per se is not active, but which, whenever combined with the solid reagent 2 contained in the main container, gives origin to a chemical reaction as a result of which the preservative gas is generated. Also the liquid reagent contained in the auxiliary container 4 can be a mixture of liquid reagents. As a consequence, the preservative gas generated by the reaction can be a single gas or a mixture of gases.

If the preservative gas must be carbon dioxide, then the solid reagent substance 2 contained in the main container 1 can be a mixture of citric acid or tartaric acid (in powder form) and sodium bicarbonate, and the liquid reagent contained in the auxiliary container 4 will be water. Particularly in the case of preservation of grapes, it is preferred to use a preservative gas which is a mixture of carbon dioxide and sulfur dioxide. For the generation of this gas mixture, the main container 1 will preferably contain as solid reagent, a mixture of citric or tartaric acid, sodium bicarbonate, and sodium or potassium bisulphite. In order to better preserve the solid reagent substance 2, to the said substance there can be mixed a moisture absorbent (hygroscopic) substance, as a protective agent against moisture infiltrations from the surrounding atmosphere.

The auxiliary container 4 is housed at the interior of the main container 2, at a certain distance from the bottom thereof, and precisely for this purpose the main container 2 presents, on two opposed sides, a pair of outward bulges 3, 103, which define corresponding inner supporting and centering step-like recesses for receiving in a precise manner edge portions of the auxiliary container 4. The main container 1 is provided with a perimetral collar 101 which serves for the positioning of a cover lid 5 made of corrugated board which closes the main container 1 in a not-tight manner, and at the same time blocks the auxiliary container 4 in a not movable manner as it clearly appears from FIGS. 2 and 3. The auxiliary container 4, filled with water, can be for example of the type well known used for the packaging of milk, and known under the commercial name of "TETRA BRIK" (Registered U.S. Trade Mark).

The cover lid 5 may be secured to the main container 1 in any known manner. In the illustrated example, and particularly in consideration of the fact that the said cover lid 5 is made of corrugated board, the main container 1 and lid 5 covering same are wrapped in an envelope 7 made of heat-shrinking plastic film material, which causes the adherence of the lid 5 on the main container 1. The protective envelope 7 can be easily torn open or it presents preferably a pair of side openings 107, 207 which serve for the passage of the gas. The protective envelope 7 is preferably transparent.

In the zone of the water-filled container 4, on the external side of the cover lid 5, or on the protective envelope 7, there is provided a marking 6.

In FIG. 4 there is shown a possible mode of utilization of the device for the production of preservative gas according to the invention, as above described. In the illustrated case, the device is utilized in combination with stack of superposed crates or trays A containing fruits or vegetables, enveloped in a gas-tight wrapping C made of plastic sheet material, and arranged on a pallet B. This assembly constitutes practically a gas-tight storage and transport element which can be stored in refrigerators. In correspondence of the top crate of fruit or vegetables there is arranged a device for generating gas according to the invention (indicated by the reference numeral 1 of the main container) and the said device is covered, together with the stack of crates, by the gas-tight wrapping C.

The activation of the gas generator takes place in the following manner: the operator pierces a hole, by using a suitable piercing needle (not shown), through the cover lid 5 of the main container 1, in correspondence of the marking 6. The piercing needle presents a predetermined length, so that it will perforate the wrapping C, the protective envelope 7, the cover lid 5 of the main container 1, and both the top and bottom sides of the auxiliary container 4, but it will not perforate the bottom of the main container 1. In this manner, the fluid reagent substance will be discharged into the main container 1 and, by combining itself with the solid reagent substance contained in the said main container, it will give place to a chemical reaction which will eventually generate the preservating gas or gases. The piercing needle presents a predetermined diameter, and/or the number of perforations is also predetermined, in such a manner that the liquid reagent will be discharged into the main container at a predetermined flow rate. The perforations made in the outer wrapping C can be closed by means of a piece of any suitable adhesive tape.

The preservative gas generated at the interior of the main container 1 escapes through the cover lid 5 (which, as above mentioned is not air-tightly secured onto the said container 1) and through the openings 7, 107 of the protective envelope 7. For this purpose, the corrugated board constituting the cover lid 5 may present suitably deep channels which provide flow passages for the gas. The thus generated gas fills the gas-tight wrapping C enclosing the stacked creates containing the fruits or vegetables, and creates the required preservative atmosphere.

The global pressure of the gas generated is very low, so that it practically does not produce any deformation on the wrapping C, also keeping in mind that leakages cannot be avoided.

In the example as shown, the gas generator was put on top of the stack of crates, since the generated gas (carbon dioxide) is heavier than air, and therefore it tends to descend. In this manner there are avoided undesired gas concentrations at the interior of wrapping 5. Should the generated gas be lighter than air, is will be obviously convenient to place the gas generator at the bottom of the stack of crates A.

It is believed that the invention will have been clearly understood from the foregoing detailed description of a preferred embodiment. Changes in the details of construction may be resorted to without departing from the spirit of the invention, and it is accordingly intended that no limitation be implied and that the hereto annexed claims be given the broadest interpretation to which the employed language fairly admits.

We claim:

1. An apparatus for the preservation of perishable food products such as fruits and vegetables contained in a storage and/or transport receptacle formed by a stack of superposed crates or trays, comprising:
(a) a gas-tight wrapping comprising a plastic sheet adapted to be pierced and enclosing the said receptacle containing the food products;
(b) a device for the generation of preservative gas or gas mixtures, said device being located at the interior of said receptacle enclosed by said wrapping, said device comprising:
 a main container (1) comprising a basin-like, water-impervious container closed at the top by a pierceable cover lid (5) in a non-gas-tight manner, said main container having a solid chemical reagent substance therein;
 an auxiliary container (4) supported at the interior of said main container (1) at a pre-determined distance from the bottom thereof by support surfaces (3, 103) in the sides of the main container (1), said auxiliary container (4) being completely sealed in a liquid-tight manner and adapted to be pierced, and containing a liquid chemical reagent substance which upon contact with the solid chemical reagent causes a chemical reaction which generates the preservative gas or gas mixtures;
said device for the generation of preservative gas being located at the interior of said receptacle in such a position that the said cover lid (5) of the main container (1) and the said auxiliary container (4) can be pierced, from the outside of the wrapping enclosing the receptacle, by one single piercing operation which allows the liquid chemical reagent to contact the solid chemical reagent.

* * * * *